Dec. 15, 1964  T. H. HOLMES  3,161,017
LIQUID ROCKET THRUST CONTROL
Filed June 24, 1959  2 Sheets-Sheet 1

INVENTOR
TRENT H. HOLMES
BY Vernon F. Hauschild
ATTORNEY

INVENTOR
TRENT H. HOLMES
BY Vernon F. Hauschild
ATTORNEY

United States Patent Office 3,161,017
Patented Dec. 15, 1964

3,161,017
LIQUID ROCKET THRUST CONTROL
Trent H. Holmes, Rocky Hill, Conn., assignor to United Aircraft Corporation, East Hartford, Conn., a corporation of Delaware
Filed June 24, 1959, Ser. No. 822,688
2 Claims. (Cl. 60—35.6)

This invention relates to liquid rockets and more particularly to thrust or rocket combustion chamber pressure control mechanism to be used therewith.

Due to the limitations of liquid rocket propellant pumping facilities, it has been found necessary to provide mechanism to control the pressure in the rocket combustion chamber into which the propellant must be pumped and hence control rocket thrust.

Accordingly, it is an object of this invention to teach mechanism to control the pressure within a liquid rocket combustion chamber to permit the pumping of propellant thereinto.

It is a further object of this invention to teach liquid rocket combustion chamber pressure control means wherein fuel is caused to be bypassed around a propellant-driven turbine, which in turn drives the propellant pumps, with such bypassing occurring in response to rocket combustion chamber pressure.

It is a further object of this invention to provide liquid rocket combustion chamber pressure control mechanism including servo mechanism responsive to rocket combustion chamber pressure and generating a servo pressure as a function thereof which regulates the amount of propellant pumped to the rocket combustion chamber.

Other objects and advantages will be apparent from the specification and claims and from the accompanying drawings which illustrate an embodiment of the invention.

Figure 1:
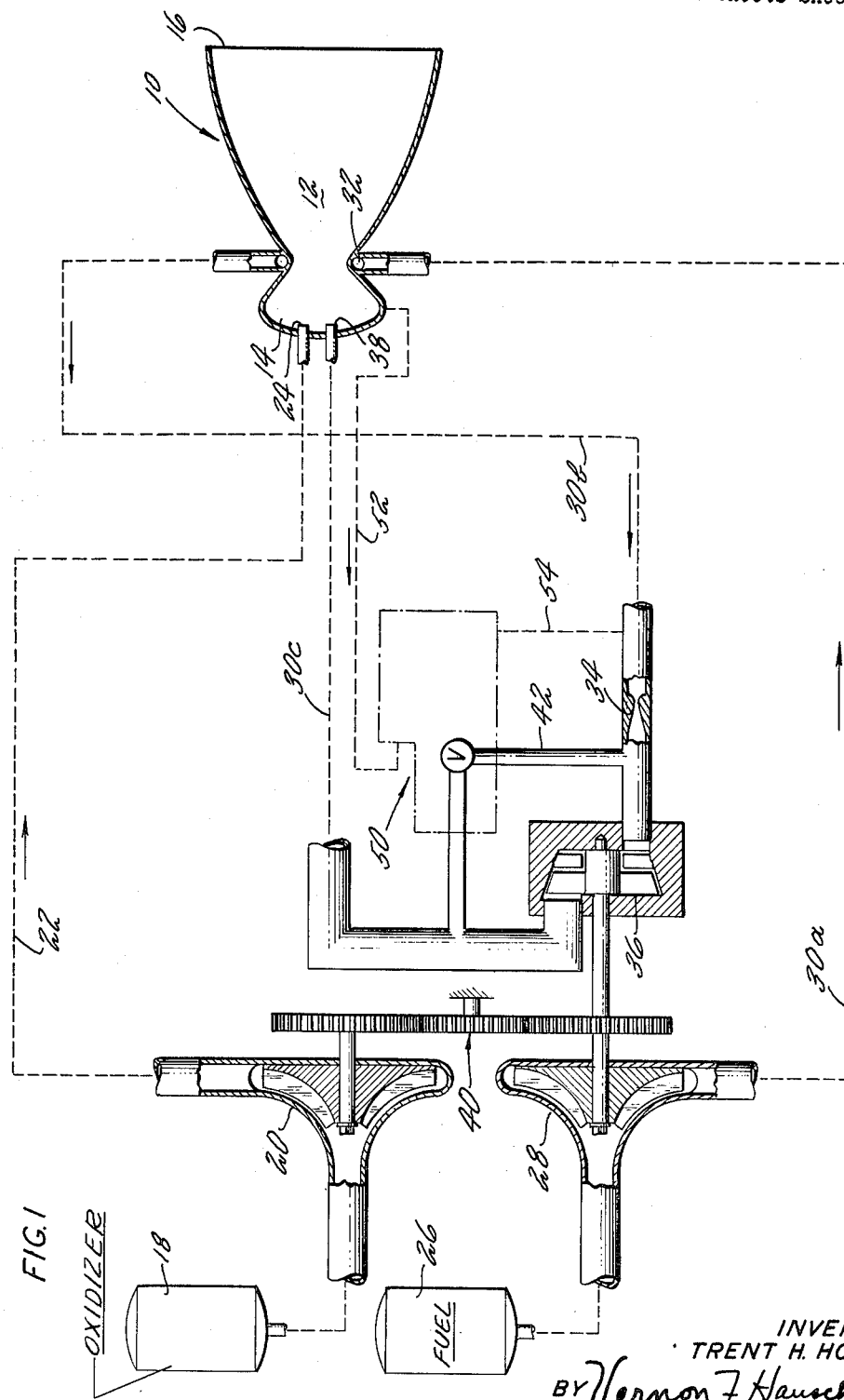
FIG. 1 is a schematic representation of a liquid rocket system utilizing my invention.

Referring to FIG. 1 we see liquid rocket 10 having combustion chamber 12, propellant inlet end 14 and thrust outlet 16. Rocket 10 preferably utilizes propellants in the form of a fuel, such as hydrogen, and an oxidizer which are cryogenic. Oxidizer is stored in oxidizer tank 18 and pumped to rocket combustion chamber 12 by oxidizer pump 20 through oxidizer conduit line 22 and enters combustion chamber 12 through oxidizer inlet 24.

Fuel is stored in fuel tank 26 and is pumped by fuel pump 28 to combustion chamber 12 through fuel conduit 30a and is heated by being passed in close proximity to combustion chamber 12, for example through manifold 32, and then passes in gaseous form through the portion of fuel conduit designated as 30b, which includes venturi 34, through pump driving turbine 36 and thence through the portion of the fuel conduit designated as 30c to combustion chamber 12 through fuel inlet 38. Turbine 36 is connected through gearing 40 to both fuel pump 28 and oxidizer pump 20 to drive both pumps at a speed which will provide fuel and oxidizer to combustion chamber 12 in the desired fuel-to-oxidizer ratio for efficient combustion.

Bypass line 42 extends between portions 30b and 30c of the fuel conduit to bypass turbine 36. My thrust or rocket combustion chamber pressure control 50 performs the function of regulating the amount of flow through bypass line 42 and hence regulating the amount of fuel pumped through and the speed of turbine 36, thereby regulating the speeds of pumps 20 and 28 and the amount of propellant in the form of fuel and oxidizer which the pumps furnish to rocket combustion chamber 12. Control 50 operates as a function of combustion chamber pressure, which is sensed and led thereto through line 52 and includes a servo mechanism which is provided with servo fluid in the form of fuel passed through line 54 from fuel conduit portion 30b immediately upstream of venturi 34. To consider the operation of thrust or rocket combustion chamber 50, let us view FIG. 2.

Rocket combustion chamber pressure is admitted to control 50 through line 52 and acts against the exterior of sensing bellows 56 to impart a motive force thereto. So that sensing bellows 56 is unaffected by pressure fluctuations which occur during rocket operation within the case 58 of control 50, case pressure is admitted into the interior of sensing bellows 56 and is also admitted to the exterior of stabilizing bellows 60 while atmospheric pressure is admitted to the interior of stabilizing bellows 60, or bellows 60 may be evacuated. Sensing bellows 56 and stabilizing bellows 60 are joined through plate 62 and rod 64 so that they coact and so that, due to the action of case 58 pressure on both in cancelling fashion, bellows unit 66, which includes sensing bellows 56 and stabilizing bellows 60, is unaffected by fluctuations in case pressure within case 58. Spring 68 acts against stationary member 70 and movable sleeve 72, which is caused to move by the exertion of rocket combustion chamber pressure against sensing bellows 56, and may be preset in a fashion to be described hereinafter to establish the setting of sensing bellows 56, that is, the value at which rocket combustion chamber pressure will commence moving bellows unit 66. Movable sleeve 72 is positioned to move plate 74, which in turn is attached to pivotal crank 76. Crank 76 is mounted to be pivotable about pivot point 78 and has a first arm 80 which is attached to move with plate 74 and a second arm 88 which acts in flapper fashion to regulate the area of variable area servo orifice 90. Servo pressure in the form of fuel is provided through line 54 to servo mechanism 92 which includes fixed restriction 94 and variable area restriction 90 positioned so that as servo fluid is passed therethrough, a servo pressure is generated in chamber 96. The servo pressure in chamber 96 acts against and moves piston 98 which carries ports 100 therein to align with similar ports 102 within bypass line 42 to establish a restriction in line 42 which controls the amount of propellant which is bypassed around turbine 36 through bypass line 42. Pin 104 is attached to servo piston 98 and is further attached to disc 106 to cause disc 106 to move in response to the movement of servo piston 98. Feedback spring 108 extends between discs 106 and 74 and performs a feedback function in repositioning movable sleeve 72 and bellows unit 66 in response to the movement of servo piston 98.

The setting of spring 68 may be adjusted by releasing nut 110 to permit the depression of pin 112, thereby releasing locking teeth 114 and permitting the rotation of pin 112. Pin 112 carries gear 116 which coacts with a mating gear 118 on member 70 to permit rotation thereof. Member 70 is joined to housing 58 through cooperating threads 120 so that the rotation of member 70 causes the translation thereof with respect to case 58 and hence changes the setting of spring 68. In this fashion the rocket combustion chamber pressure at which control 50 will be actuated may be controlled and adjusted.

*Operation*

During rocket operation the fuel and oxidizer being furnished to rocket combustion chamber 12 are ignited either due to their hypergolic nature or by any well-known ignition means such as a spark plug (not shown) and burn in combustion chamber 12 to generate pressurized and heated gases which will be discharged therefrom to atmosphere through outlet 16 to generate thrust. The pressure within combustion chamber 12 is important because the thrust generated by liquid rocket 10 varies as a function thereof and also because if the combustion chamber pressure increases sufficiently, pumps 20 and 28 will be unable to generate sufficient propellant pressure to cause the propellants to be injected into combustion chamber 12 through inlets 24 and 38. Further, if a plurality of rocket engines are used, it may be desirable to balance the throat of each by controlling combustion chamber pressure. Accordingly, it is necessary to control the combustion chamber pressure, and such is done by my control 50 in the following fashion.

Figure 2:
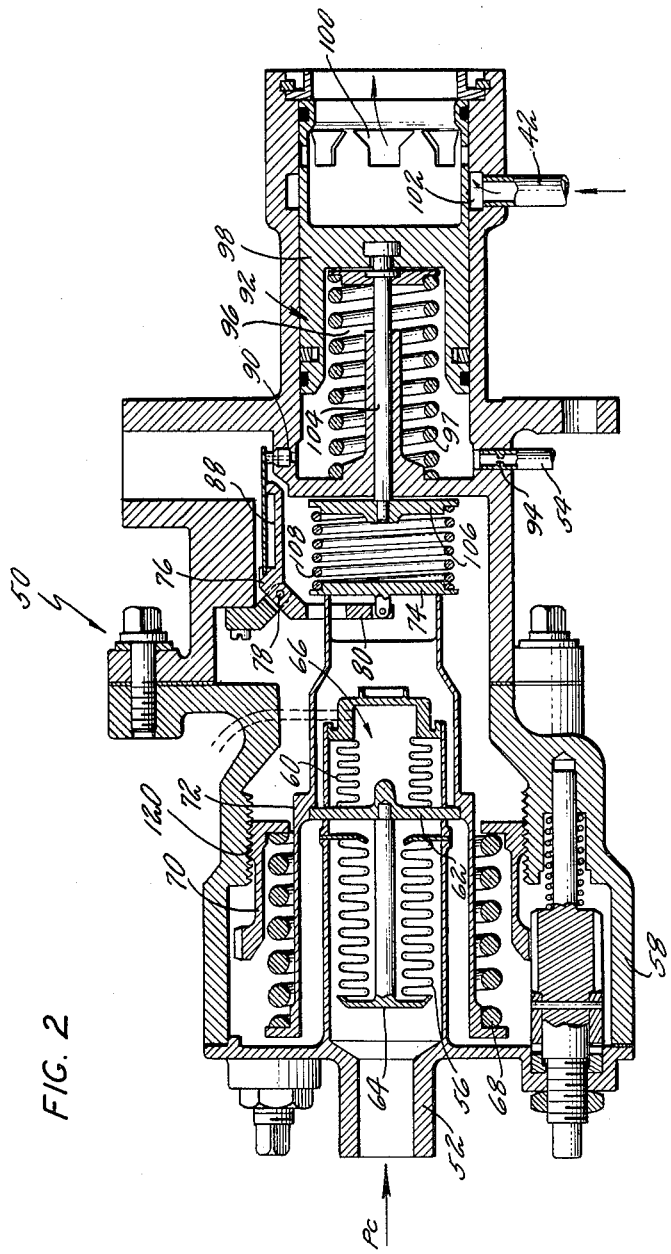
FIG. 2 is an enlarged cross-sectional showing of my rocket combustion chamber pressure or thrust control.

When the combustion chamber pressure exceeds the selected value, determined by the setting of spring 68, a combustion chamber pressure passing through line 52 causes sensing bellows 56 to move rightwardly as shown in FIG. 2 and to move sleeve 72 therewith. The rightward movement of sleeve 72 causes a rightward movement of plate 74 and a counterclockwise rotation of crank 76 about pivot point 78. This action of crank 76 increases the area of variable area orifice 90 of servo mechanism 92 to decrease the servo pressure within servo chamber 96 and hence permit servo piston 98 to move leftwardly since previously piston 98 had been in balance by the equating of the combined force of the servo pressure in chamber 96 and spring 97 acting on the left side thereof and the turbine discharge pressure acts on the right side thereof to cause window ports 100 to more completely align with ports 102 and hence increase the flow of fuel through bypass line 40 to decrease the speed of turbine 36, pumps 20 and 28 and hence decrease the amount of propellant provided to combustion chamber 12 to reduce combustion chamber pressure. Had there been a decrease in combustion chamber pressure, the opposite action would occur.

It is to be understood that the invention is not limited to the specific embodiment herein illustrated and described but may be used in other ways without departure from its spirit as defined by the following claims.

I claim:

1. A liquid rocket having a combustion chamber, fuel conduit means with a first pump therein to provide fuel to said combustion chamber, oxidizer conduit means with a second pump therein to provide oxidizer to said combustion chamber, a turbine located in said fuel conduit means to be driven by the fuel passing therethrough, gear means connecting said first and second pumps to said turbine to be driven thereby, a bypass line in said fuel conduit means bypassing said turbine, rocket combustion chamber pressure control means including means sensing combustion chamber pressure, balanced bellows means movable in response to combustion chamber pressure, means controlling the setting of said bellows means, a servo system having a fixed and variable area orifice with means to pass fuel from said fuel conduit means therethrough to establish a servo pressure therebetween, a pivotal crank having a first arm engaging said movable means and a second arm positionable to vary the area of said variable area orifice so that the area of said variable area orifice and hence said servo pressure is responsive to the movement of said movable means, a flow restricting valve located in said bypass line and actuated by said servo pressure to regulate the amount of fuel bypassed around said turbine and hence speed and the amount of fuel pumped through said turbine and hence the speed of and the amount of fuel and oxidizer pumped by said pumps to said rocket combustion chamber, and feedback means repositioning said crank and bellows means in response to the movement of said flow restricting valve.

2. A liquid rocket having a combustion chamber, fuel conduit means with a first pump therein to provide fuel to said combustion chamber, oxidizer conduit means with a second pump therein to provide oxidizer to said combustion chamber, a turbine located in said fuel conduit means to be driven by the fuel passing therethrough, gear means connecting said first and second pumps to said turbine to be driven thereby, a bypass line in said fuel conduit means bypassing said turbine, rocket combustion chamber pressure control means including means sensing combustion chamber pressure, balanced bellows means movable in response to combustion chamber pressure, a servo system having a fixed and variable area orifice with means to pass fuel from said fuel conduit means therethrough to establish a servo pressure therebetween, a pivotal crank having a first arm engaging said movable means and a second arm positionable to vary the area of said variable area orifice so that the area of said variable area orifice and hence said servo pressure is responsive to the movement of said movable means, a flow restricting valve located in said bypass line and actuated by said servo pressure to regulate the amount of fuel bypassed around said turbine and hence speed and the amount of fuel pumped through said turbine and hence the speed of and the amount of fuel and oxidizer pumped by said pumps to said rocket combustion chamber, and feedback means repositioning said crank and bellows means in response to the movement of said flow restricting valve.

References Cited by the Examiner

UNITED STATES PATENTS

| 2,483,045 | 9/49 | Harby | 60—35.6 |
| 2,757,511 | 8/56 | Jagger | 60—39.28 |
| 2,882,680 | 4/59 | Jamison et al. | 60—39.28 |
| 2,916,876 | 12/59 | Colley et al. | 60—39.28 |

FOREIGN PATENTS

| 796,093 | 6/58 | Great Britain. |

OTHER REFERENCES

Rocket Propulsion Elements, by G. P. Sutton, published by John Wiley & Sons, New York, N.Y., pages 298 and 299—1956.

SAMUEL LEVINE, *Primary Examiner.*

SAMUEL FEINBERG, *Examiner.*